June 25, 1940.
C. S. WOODING, JR
2,205,707
CORN PICKING MACHINE
Filed May 2, 1939
3 Sheets-Sheet 1
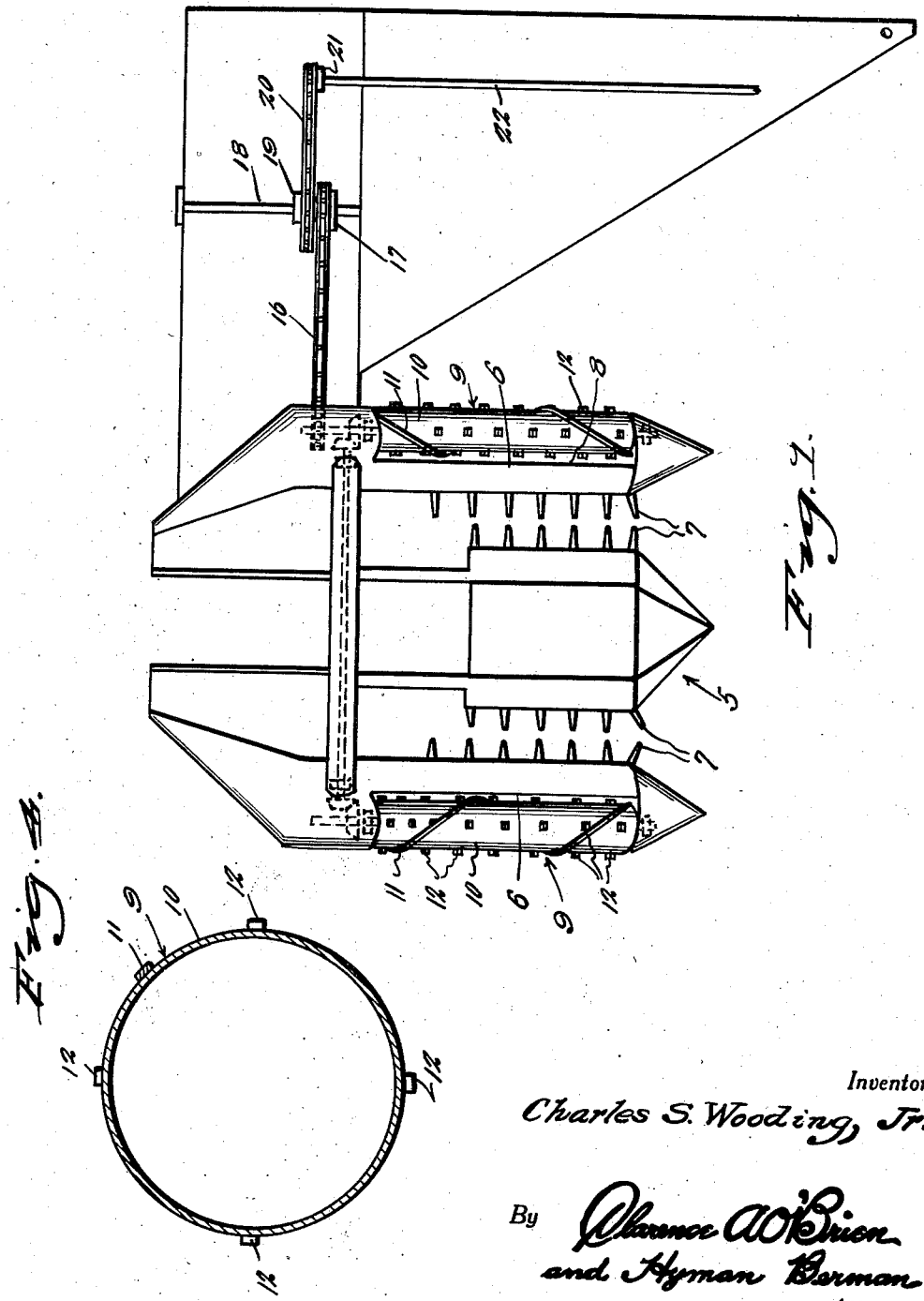
Inventor
Charles S. Wooding, Jr.
By Clarence A. O'Brien
and Hyman Berman
Attorneys

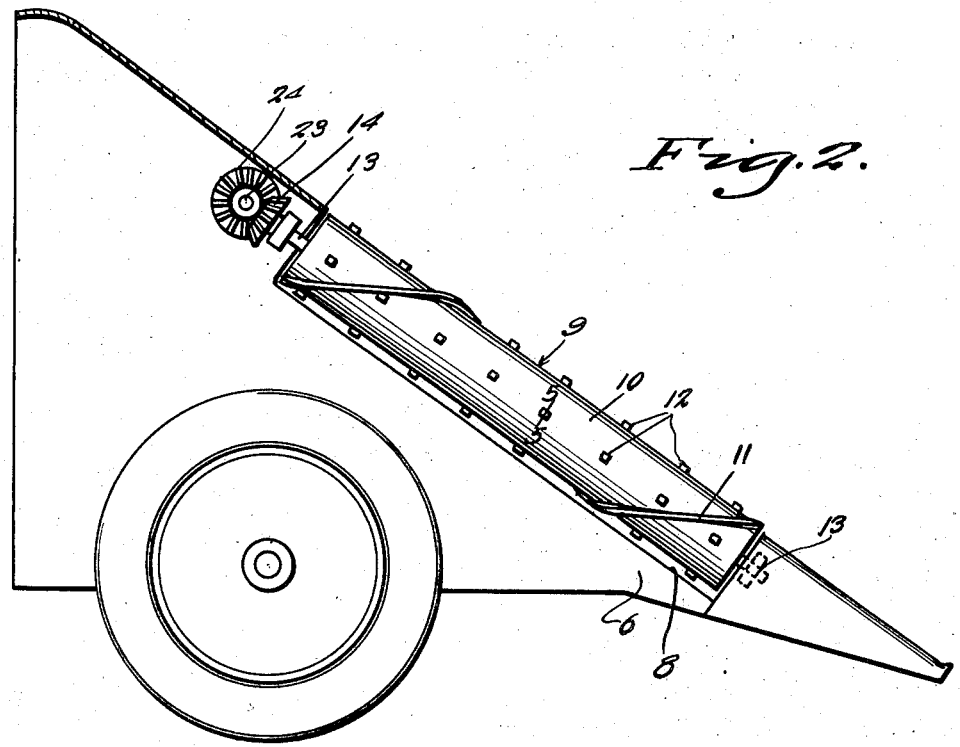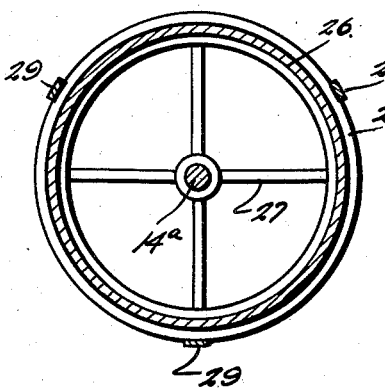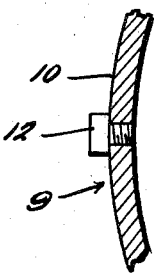

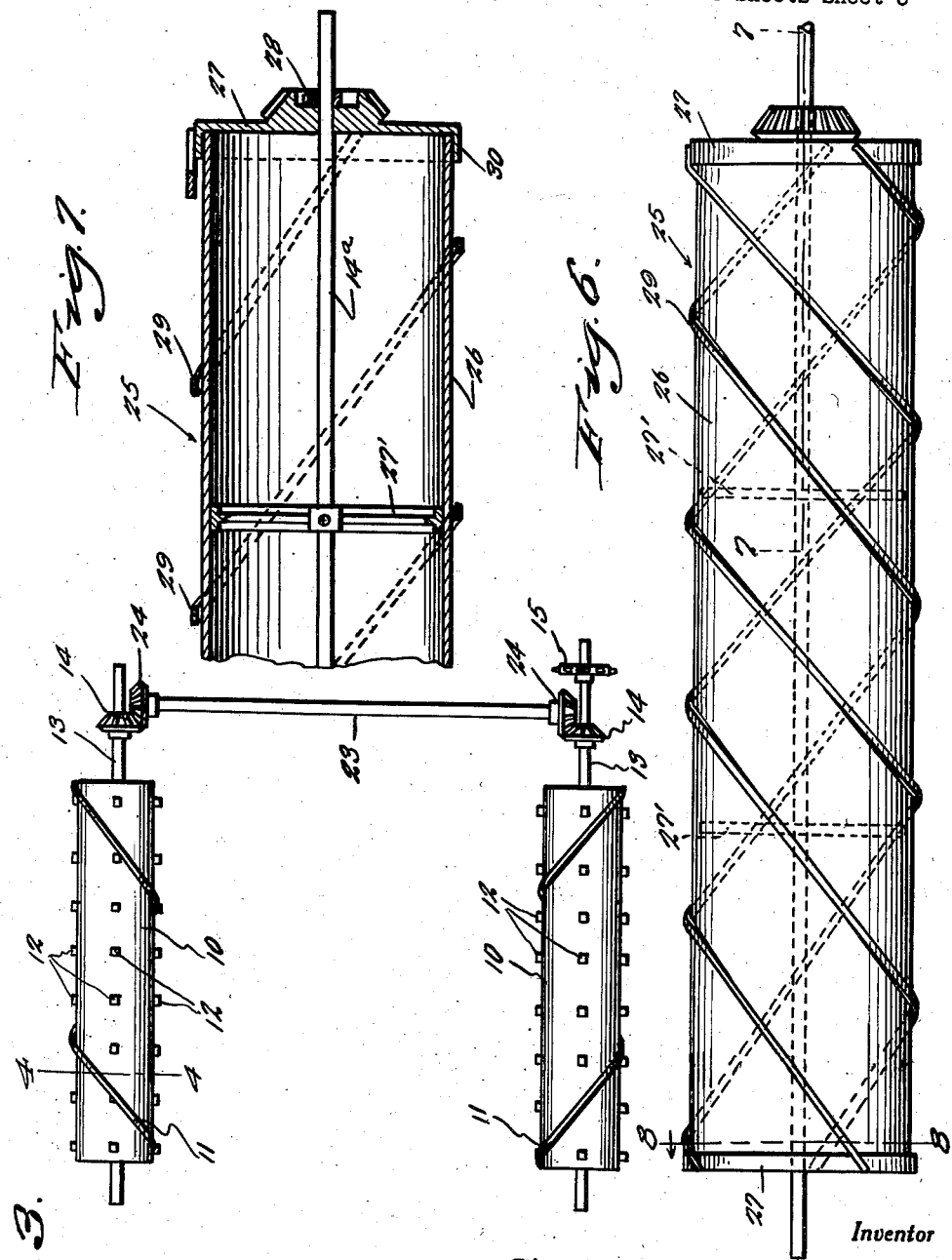

Patented June 25, 1940

2,205,707

UNITED STATES PATENT OFFICE 2,205,707

CORN PICKING MACHINE

Charles S. Wooding, Jr., Chenoa, Ill.

Application May 2, 1939, Serial No. 271,414

2 Claims. (Cl. 56—119)

This invention appertains to new and useful improvements in corn harvesters and more particularly to a corn picker wherein the principal object is to provide means for not only harvesting corn on sturdy stalks, but also corn that has fallen such as on bent-over stalks, and that would otherwise be lost.

Another important object of the invention is to provide a corn harvesting machine which includes rotors for picking up corn that is down and resetting the same in proper position for gathering effect by the picker.

Other objects and advantages of the invention will become apparent to the reader of the following specification.

In the drawings:

Figure 1 represents a top plan view of a portion of a picker machine.

Figure 2 is a side elevational view partly in section to show the gears.

Figure 3 is a top plan view of the auxiliary picker cylinders.

Figure 4 is an enlarged cross section on the line 4—4 of Figure 3.

Figure 5 is an enlarged sectional view on the line 5—5 of Figure 2.

Figure 6 is an enlarged top plan view of the reel type auxiliary picker.

Figure 7 is an enlarged sectional view on a line 7—7 of Figure 6.

Figure 8 is an enlarged cross sectional view on a line 8—8 of Figure 6.

Referring to the drawings, wherein like numerals designate like parts, it can be seen in Figure 1, that numeral 5 generally refers to a picking machine of the two-row type which in general respects is conventional, the same consisting of the side shields 6—6 and the two picker lines consisting of converging teeth 7 on endless chains (not shown) such as are found in conventional corn harvesting machines.

In carrying out the present invention, each of the side shields 6 is cut away as at 8 to accommodate the corresponding auxiliary picker cylinder which is generally referred to by numeral 9. Each of these cylinders consists of the drum 10 having a longitudinally extending spiral rib 11 disposed thereon and suitably secured thereto and driven into this drum 10 at longitudinally spaced intervals are circumferential rows of studs 12, each having a threaded portion for disposition into the drum and a polygonal shaped outwardly projecting head.

Each of these drums 10 is mounted on a shaft 13 which at its upper end has a bevel gear 14. One of these shafts 13 has a sprocket wheel 15 at its upper end which is driven by a sprocket chain 16 extending from the sprocket wheel 17 on the counter shaft 18. On the shaft 18 which is journalled through suitable bearings is the sprocket wheel 19 over which the sprocket chain 20 is trained and this chain 20 also extends over the sprocket wheel 21 on the power take-off shaft 22 (see Fig. 1).

One drum 10 drives the other through the agency of a shaft 23 which at its ends is equipped with bevelled gears 24—24 for mesh with the bevelled gears 14 on the shaft 13.

It can be seen, that rotation of the drums 9 will result in the picking of the ears of corn from the corn stalks. Obviously, the spirals 11 serve to feed the ears upwardly. Obviously, the studs 12 serve to catch the ears to carry the same inwardly where they are moved upwardly by the spiral 11.

A reel type of auxiliary means is generally referred to by numeral 25 and is shown in Figures 6, 7 and 8. Each of these reel types 25 which can be substituted for the type generally referred to by numeral 9, consists of a stationary cylinder 26 which has internal spiders 27' through which the shaft 14a is journalled. At each end of the stationary cylinder 26 is a disk 27 against which a stop collar 28 on the shaft 14a bears.

Circumscribing the cylinder 26 and slightly spaced therefrom are the spiral bands 29 which extend longitudinally of the cylinder 26 and are connected at their ends to the disks 27, these disks preferably having skirt portions 30 which overlap the ends of the cylinder 26.

Thus it can be seen that down corn in settling on the stationary drum 26 is fed upwardly of the drum by the spirals 29.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a corn picking machine, picking means, a side shield and an auxiliary corn catching rotor mounted on the shield adjacent the picker means, said roll being provided with a spiral rib extending longitudinally thereof and outwardly projecting studs on the roll.

2. In a corn picking machine, picking means, a side shield, an auxiliary corn catching drum rotatably mounted on the shield and adjacent the picker means, said drum being provided with a spiral rib extending longitudinally thereon, and spaced studs projecting from the periphery of the drum and arranged in longitudinal and circumferential rows.

CHARLES S. WOODING, JR.